Nov. 5, 1963 L. K. EDWARDE 3,109,624
VALVE BODY CONSTRUCTION
Filed March 29, 1961
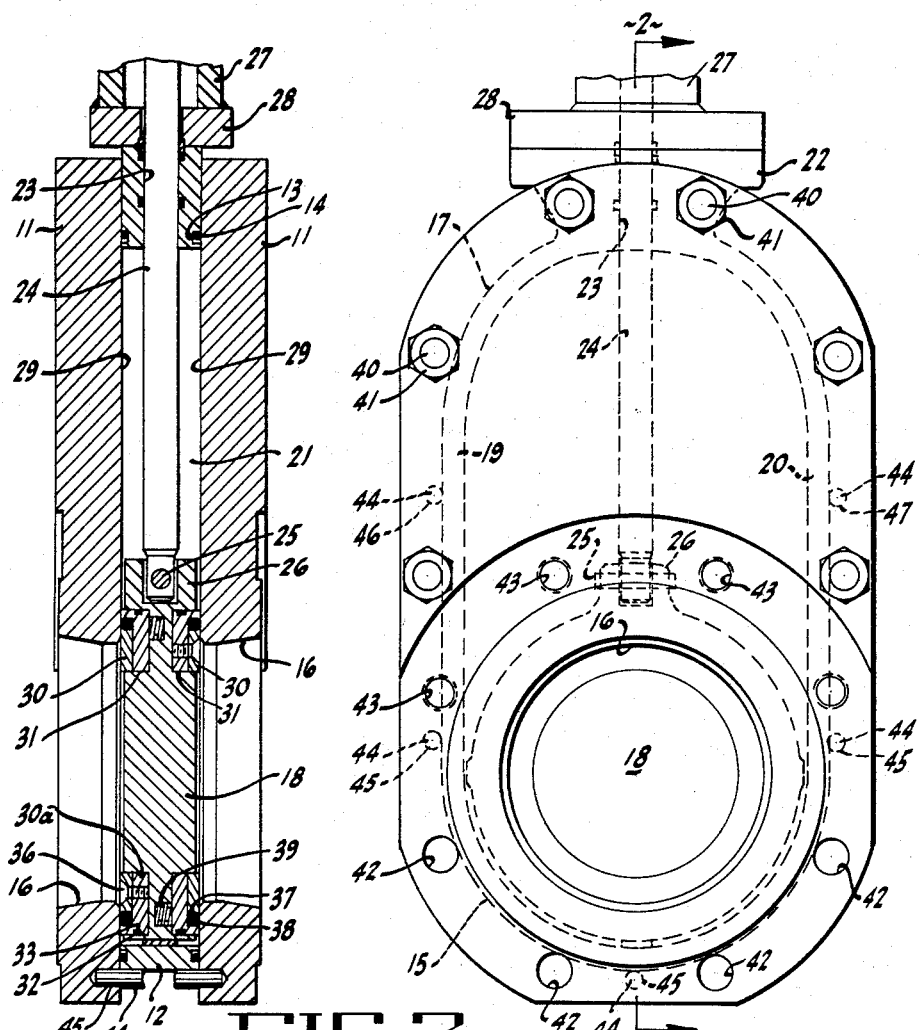
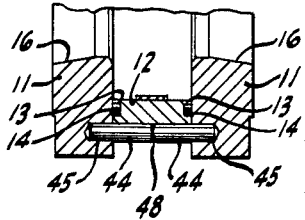
INVENTOR.
LEO K. EDWARDE
BY
ATTORNEY

3,109,624
VALVE BODY CONSTRUCTION
Leo K. Edwarde, Piedmont, Calif., assignor to Grove Valve and Regulator Company, Oakland, Calif., a corporation of California
Filed Mar. 29, 1961, Ser. No. 99,251
6 Claims. (Cl. 251—329)

This invention relates generally to the construction of valves of the sliding gate type, and more particularly to the type that have opposed plate-like side members between which is clamped a transversely elongated thin metal loop or band forming a housing for the sliding gate, and characterized by a plurality of members positioned outside of a portion of the loop and between the side members to support that portion of the loop against outward forces due to internal fluid pressures.

Heretofore gate valves of this type have been fabricated from relatively thick metal side members bolted together upon an intermediate elongated loop or band of relatively thin metal, one substantially semi-circular part of the loop enclosing the aligned openings for fluid passage through the valve, the other substantially semi-circular part being laterally displaced to form a pocket into which the valve gate is withdrawn when passage of fluid is desired. Parallel side walls connect the two substantially semi-circular parts of the loop, the whole being suitably sealed to the parallel inner faces of the side members. The thinness of the loop is an advantage in its fabrication, which may be done by drawing a properly machined circular band into the required oval or looplike shape, but it is a disadvantage when high internal fluid pressures are involved, particularly in those portions of the loop which comprise the parallel and hence flat side walls. Previously these portions have been supported or reinforced by a plurality of metal lugs welded to and projecting inwardly from the inside faces of the side members. However, these fixed lugs have the disadvantage of precluding the refacing of those inner surfaces when the valve is to be reconditioned after use, unless they are all removed. Thereafter they must be replaced and the welding operation that is thus involved tends to warp or distort the side members so that they are no longer flat.

It is an object of this invention to provide a plurality of removable, generally cylindrical metal pins or dowels projecting inwardly from suitable holes in the side members to engage the outside of at least the parallel side wall portions of the thin loop forming the gate housing, to align the loop and also to support it against the outward forces due to high internal fluid pressure in the valve.

Another object is to provide an improved side member construction of the type described that involves only face machining and drilling operations and omits any welding that would distort or warp the side member from a truly plane inner surface already formed thereon.

Another object is to provide an improved valve body construction that is easily assembled and aligned in the field as well as in the shop.

Another object is to provide improved valve body reinforcing elements that are of inexpensive and standardized unit construction, viz., generally cylindrical pins that are of solid metal, or grooved longitudinally, or rolled into a spiral or a simple closed loop, all of which are readily available on the market and at a cost far below that of specially machined and welded plate lugs heretofore employed.

These and other objects and advantages will be further apparent from the following description and the attached drawing, which forms a part of this specification and illustrates a preferred embodiment of the invention.

In the drawing, FIGURE 1 is a side elevational view showing a valve body embodying the improved loop-reinforcing or support pins of this invention.

FIGURE 2 is a longitudinal sectional view on line 2—2 of FIGURE 1.

FIGURE 3 is a fragmental sectional view of only the lower portion of the body of FIGURE 2 showing an alternative arrangement of opposed and abutting reinforcing or support pin members.

Referring to the drawing, the valve illustrated comprises two metal side plates or parts 11, in this case of substantial thickness to provide rigidity, spaced apart by an intermediate metal body part or loop 12, of oval configuration. Desirably, this loop is fabricated by first machining the edges of a circular metal band to form grooves 13 to receive O-rings 14 and then drawing it out to an oval shape as indicated by the dotted lines of FIGURE 1 to form a lower semi-circular portion 15, which encloses the aligned fluid passages or openings 16 in side parts 11, and an upper semi-circular portion 17 which forms a pocket into which the valve gate 18 may be withdrawn. (This method of fabrication is described in copending application of Austin U. Bryant and myself entitled "Valve Construction," Serial No. 87,571, filed February 7, 1961.) The two substantially semi-circular parts 15 and 17 are joined by the flat parallel portions 19 and 20 to form the housing space 21 enclosing the valve gate 18. At the top of the loop 12, in this example, a metal block 22 is secured as by welding or is integral with the loops and a sealed passage 23 is provided for the sliding valve stem 24, the lower end of which is pinned as at 25 to a boss 26 on the valve gate. A yoke 27 is flanged as at 28 to the top of block 22 and supports any desired means (not shown) for moving the stem 24 and valve gate 18 within housing space 21 between the smooth parallel inner faces 29 of side parts 11. The stem 24 may be operated by any suitable means, e.g., by a hand wheel, by gears or by hydraulic means; or the stem may be eliminated and the gate may be operated by a lever, all such operating means being well known in the art.

Gate member 18 is in the form of a generally circular disc and is provided with sealing means on both of its flat faces. Desirably, these comprise seat rings 30 and 30a received in an annular groove 31 and having a peripheral O-ring 32 in circumferential groove 33. The seat rings 30a are L-shaped in cross section. The seat rings 30 and 30a are secured together by a plurality of recessed set screws 36. The groove 37 formed by each pair of seat rings 30 and 30a receives a face O-ring 38. A plurality of springs 39 behind each pair of seat rings 30, 30a urges them and the O-rings 38 outwardly so that a fluid-tight seal is formed against the parallel faces 29, particularly when the gate 18 is in the closed position shown. The gate member and sealing means just described form no part of this invention but are described and claimed in the copending application of Austin U. Bryant, Serial No. 106,888 filed May 1, 1961, entitled Gate Valve With Floating Seat Rings and assigned to the common assignee herewith.

Side parts 11 are clamped to both outside faces of loop 12 to form housing 21 by means such as through bolts 40 and nuts 41 (FIGURE 1) and the usual concentric bolt circle is provided around the fluid passages 16 in the form of drilled holes 42 and tapped holes 43 to receive bolts and studs (not shown) to secure the valve in a piping system, as is usual in this art.

Proceeding now from the general description of the environment of the invention, the particular features of the present improvement will be discussed. It is apparent that when bolts are placed in drilled holes 42 of the bolt circle (FIGURE 1) the lower semi-circular portion 15 of loop 12 will be aligned and supported thereby between side plates 11. However, this will not normally take place until the valve is installed in the field. Accordingly, to accomplish this function at the time of assembly in the shop, as well as after installation in the piping system, a plurality of cylindrical metal members or pins 44 are removably placed in drilled holes 45 so as to project inwardly from the inner faces 29 of side members 11, as shown in the drawing. Additionally, to align and to support the flat or parallel side portions 19 and 20 of loop 12 against forces due to internal fluid pressure, similar pin or dowel members 44 are placed in drilled holes 46 and 47. These members may be of any desired construction, such as a solid pin, with or without a longitudinal groove, a rolled loop, or a spiral, all of which are staple articles of commerce and are readily available at low cost. Also, they may project only part way across the width of loop 12, as in FIGURE 2, or may abut in the center at 48 as illustrated in FIGURE 3.

As stated, the members 44 may be solid cylindrical pins with or without a longitudinal groove, or they may be in the form of a spiral or a rolled loop, or they may be tapered pins, all of which are well known in the art. Solid cylindrical pins which are untapered and ungrooved will tend to fall out and in such case the embodiment of FIGURE 3 is preferred wherein the ends of the pins abut one another to prevent their unintentional dislodgement. Tapered, grooved and certain other pins can be wedged in place, therefore permit the embodiment of FIGURE 2 and even permit a staggered, non-aligning arrangement of the pins.

The invention offers numerous advantages in fabrication, e.g., the holes 45, 46 and 47 may be drilled at the same time as holes 42. No welding or cutting is done on the inner faces 29 of side members 11, either at the time those faces are first machined during fabrication, or thereafter, when the valve is reconditioned and refaced after a period of use. In fact, it is feasible to reface those parts in the field and without removing the valve from the piping system, by first removing the loop 12 and valve gate 18 as a unit, as will be apparent to one skilled in this art. Such advantages are not present in the previously used welded metal lug construction mentioned above, and have proved to be of great convenience and commercial utility.

It is apparent also that numerous changes and modifications are possible without departing from the essential features of the invention, and all such that fall within the scope of the appended claims are intended to be embraced thereby.

I claim:

1. A valve structure of the character described comprising a valve body having a flow passage therethrough and a valve member movable within said body to open and close said passage, said body being formed of two opposed, spaced body plates and an intermediate body part between and in contact with said plates, said intermediate body part being in the form of a relatively thin metal band which tends to bulge outwardly due to fluid pressure within the body, and means for opposing such pressure, said means being in the form of a plurality of pins each removably socketed in one of said body plates and projecting inwardly from the surface of such plate so that a shank portion thereof is in contact with said intermediate body part and terminating short of the other of said body plates, said pins being distributed about and adjacent the outer surface of said intermediate body part, and portions carried on said other body plate opposite the end of each of said pins and spaced therefrom a distance less than the depth to which said pin is set.

2. In a valve construction for controlling fluid flow in which the valve body is formed of interiorly parallel plate-like metal side parts having aligned openings near one end for communicating with associated piping, an elongated metal loop of relatively thin walled material interposed between said side parts to form a housing enclosing said openings and extending transversely therefrom to form a pocket, a valve gate movable transversely within said housing from said pocket to overlap and to seal said openings, means passing through both of said side parts outside of said loop for clamping the edges of the latter to form a fluid-tight seal for said housing, and a plurality of members projecting inwardly from each of said side parts to engage the outer face of at least a portion of said loop and support it against forces due to fluid pressure within said housing, said members being arranged in pairs with the members of each pair being removably inserted in alignment in opposite side parts to extend therefrom with their protruding ends closely adjacent to each other.

3. A valve construction according to claim 2 in which said last named members comprise cylindrical metal pins, and with opposed recesses in said side plates for removably receiving said pins.

4. A valve construction according to claim 2 in which said loop comprises parallel side walls connecting an upper substantially semi-circular portion enclosing the upper side of said pocket and a lower substantially semi-circular portion enclosing the lower side of said openings, and said members engage only said parallel side walls and the lower semi-circular portion of said loop, whereby said entire loop and said valve may be withdrawn upwardly from between said side parts when said clamping means are loosened.

5. A valve construction according to claim 4, in which said members comprise cylindrical metal pins received in holes in the inner faces of said side parts, so constructed and arranged that the entire inner faces of said side parts may be refaced when said clamping means, said loop and valve, and said pins are removed from said side parts.

6. A valve construction of the character described comprising a valve body formed of sheared end plates having openings therein to provide a flow passage through the valve, and a relatively thin band between said plates, said body parts being secured together, a valve member movable within the body space formed by said body parts to open and close said flow passage, and reinforcement means mounted on the interior faces of said end plates externally of and adjacent to said band, said reinforcement means being in the form of pins removably socketed in said end plates, said pins being arranged in aligned pairs with the protruding unsocketed ends of each pair being closely adjacent to each other.

References Cited in the file of this patent

FOREIGN PATENTS 1,053,141   France _____ Sept. 30, 1953